Nov. 13, 1928.
A. J. BATES, JR
1,691,264
WORK FEEDING MECHANISM FOR SHEARING MACHINES
Filed Oct. 11, 1926     8 Sheets-Sheet 1
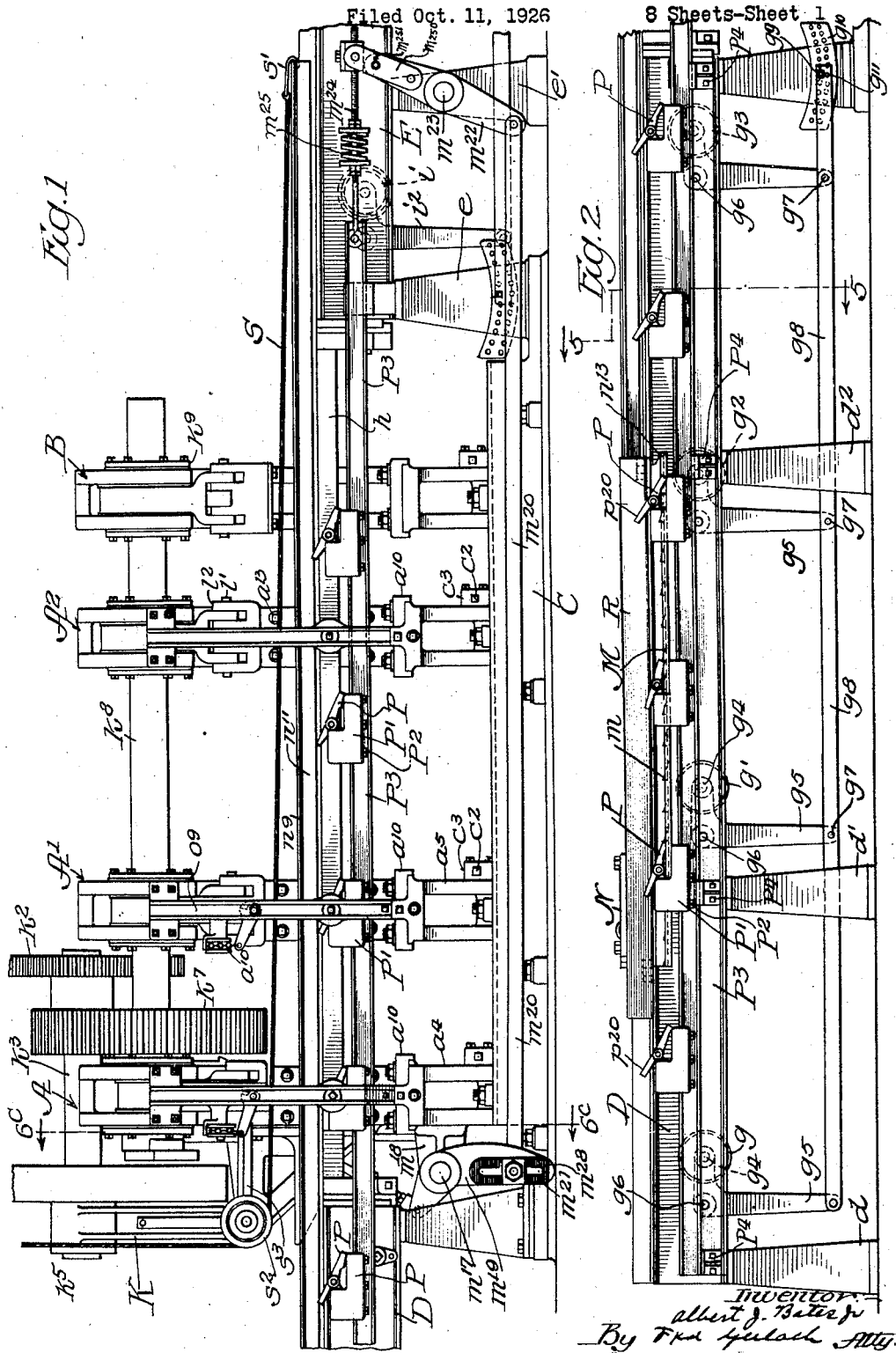

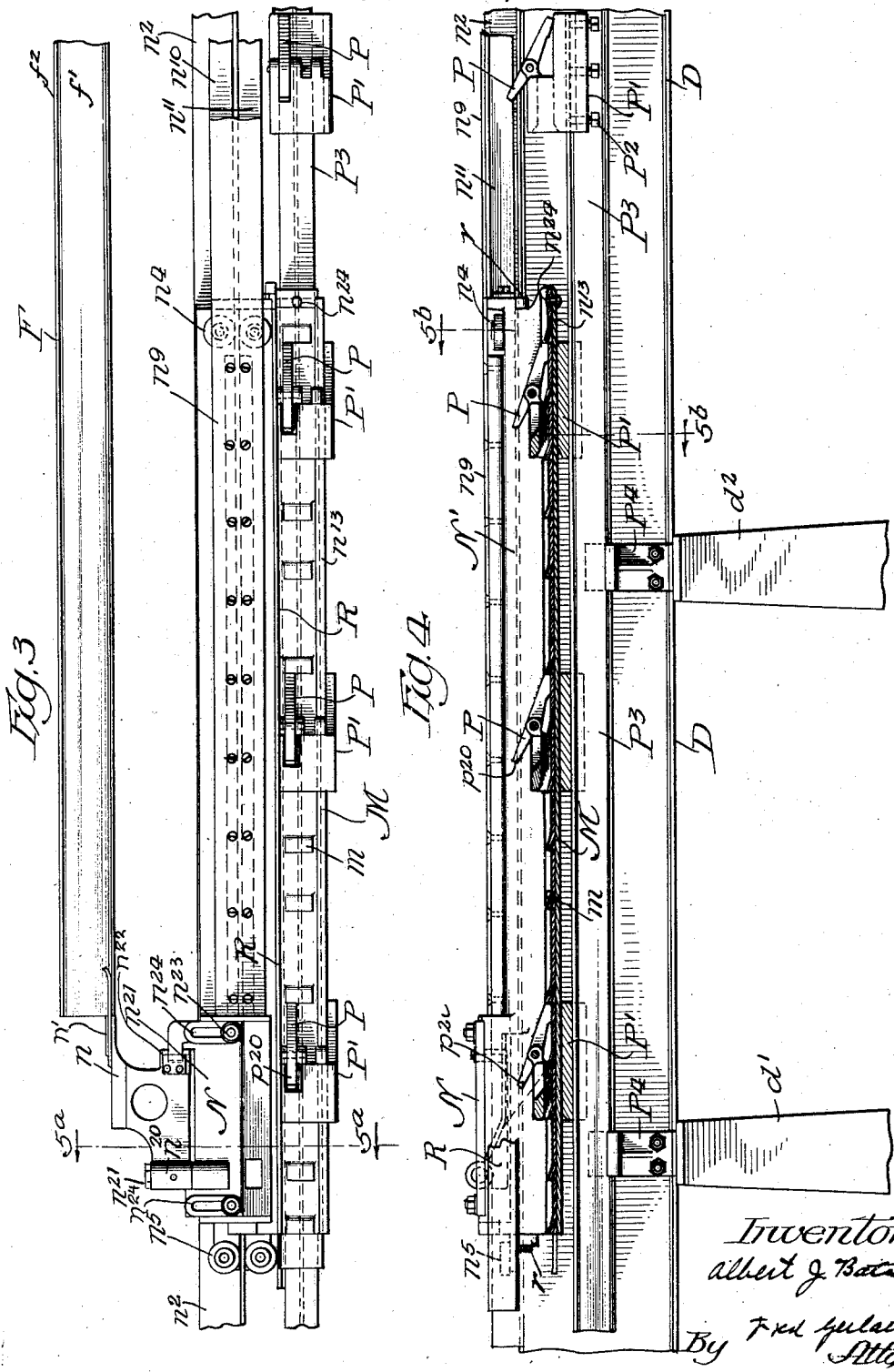

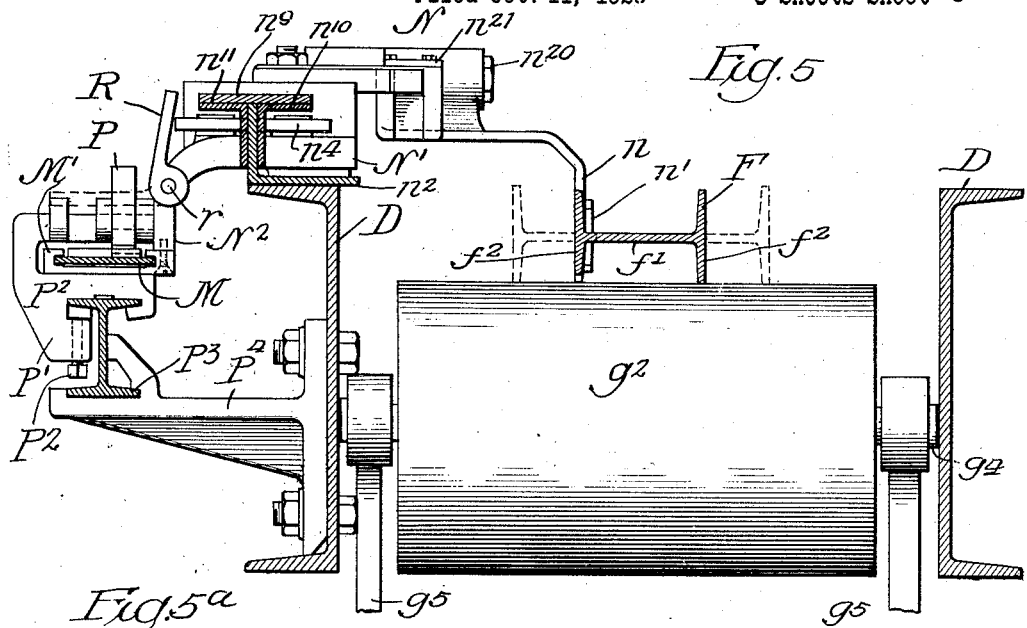
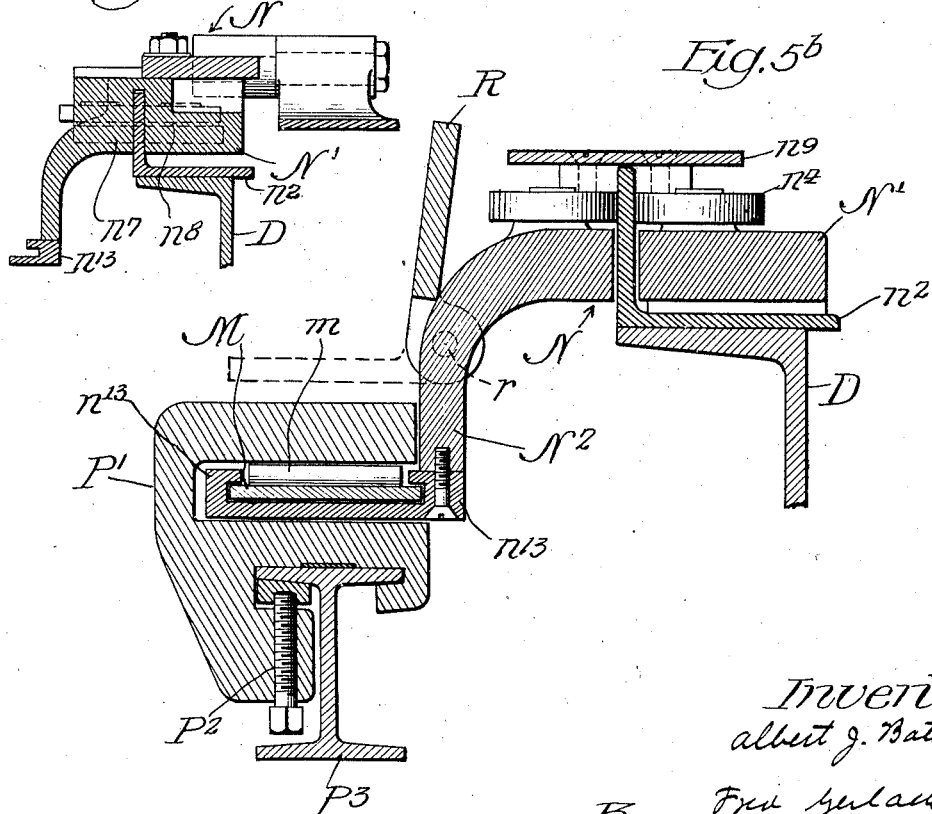

Nov. 13, 1928.
A. J. BATES, JR
1,691,264
WORK FEEDING MECHANISM FOR SHEARING MACHINES
Filed Oct. 11, 1926    8 Sheets-Sheet 4
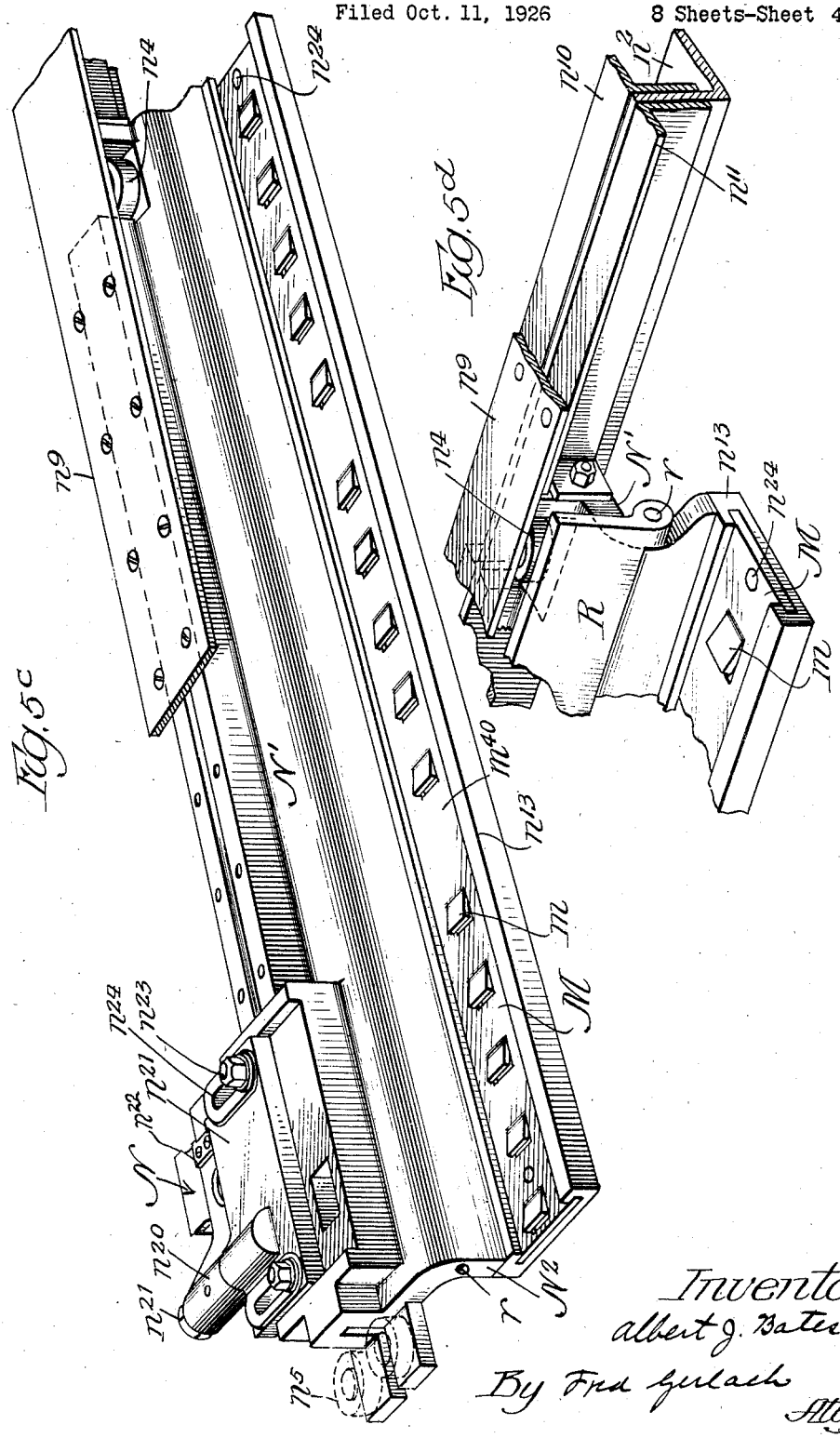
Inventor
Albert J. Bates Jr.
By Fred Gerlach
Atty.

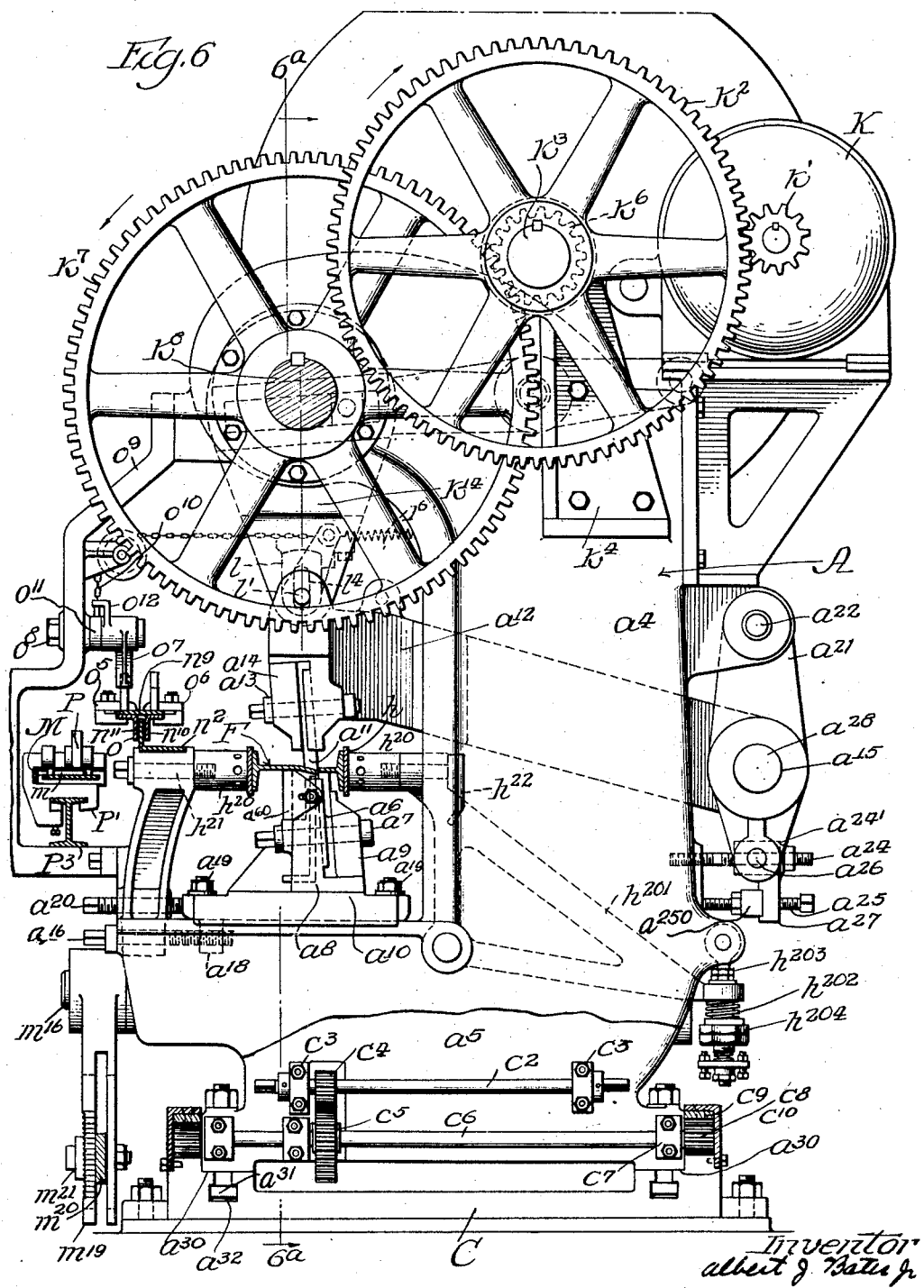

Nov. 13, 1928.

A. J. BATES, JR 1,691,264

WORK FEEDING MECHANISM FOR SHEARING MACHINES

Filed Oct. 11, 1926    8 Sheets-Sheet 6

Fig.6ª

Fig.6ᵇ

Inventor:
Albert J. Bates Jr
By Fred Gulach
Atty

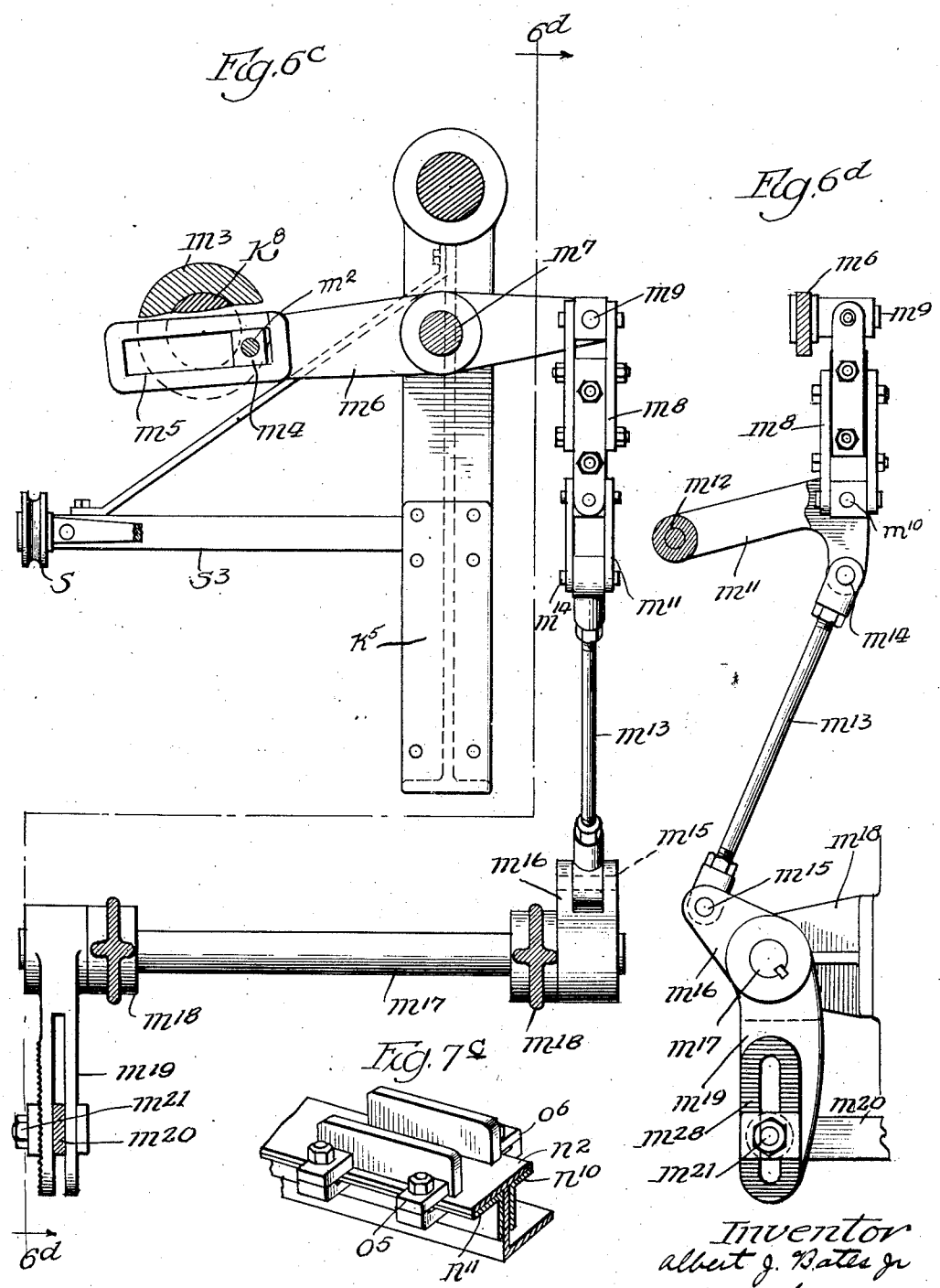

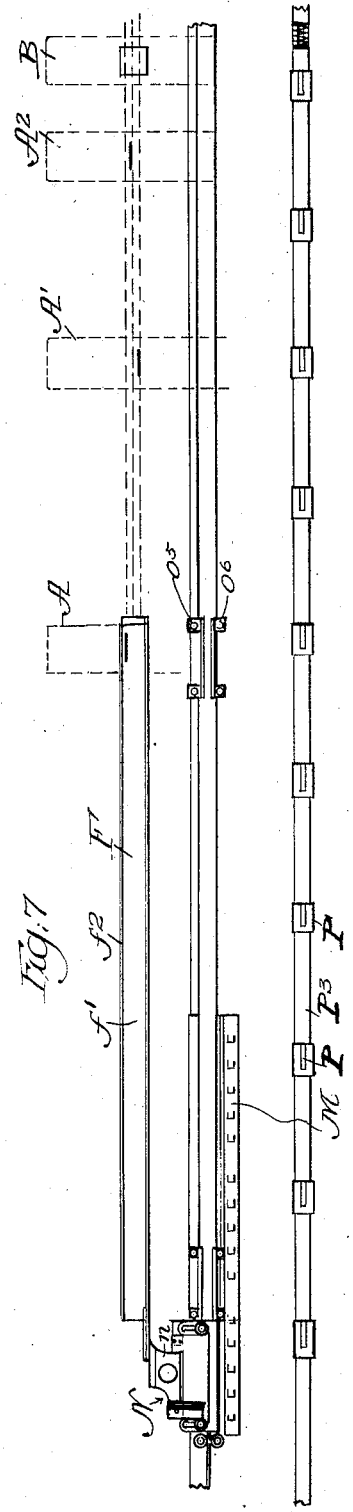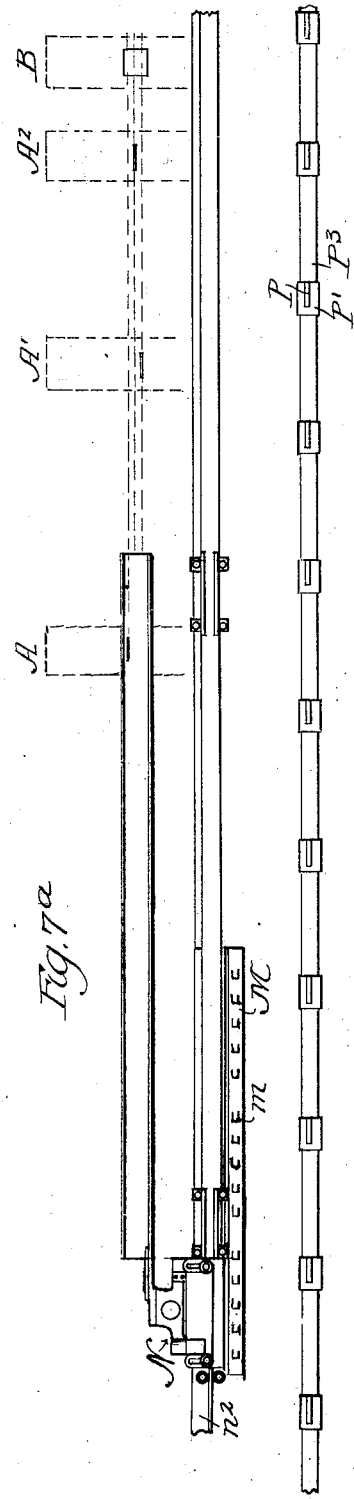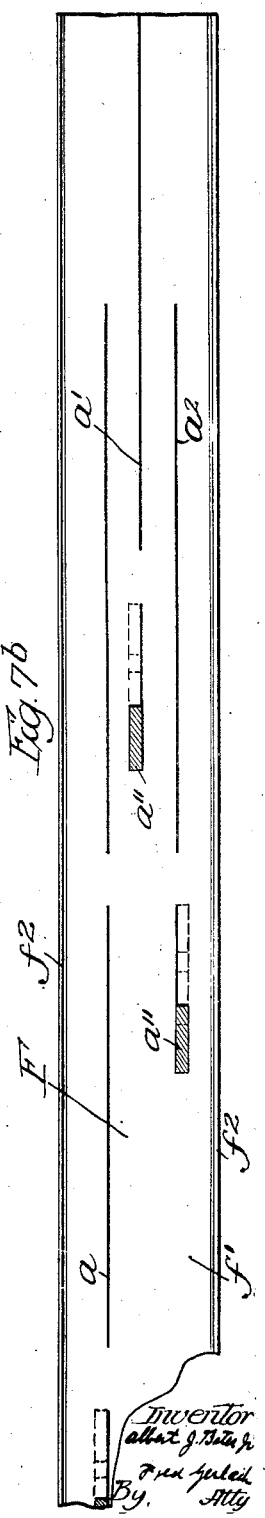

Patented Nov. 13, 1928.

1,691,264

UNITED STATES PATENT OFFICE.

ALBERT J. BATES, JR., OF CHICAGO, ILLINOIS, ASSIGNOR TO BATES EXPANDED STEEL TRUSS CO., OF EAST CHICAGO, INDIANA, A CORPORATION OF DELAWARE.

WORK-FEEDING MECHANISM FOR SHEARING MACHINES.

Application filed October 11, 1926. Serial No. 140,767.

The invention relates to reciprocatory machines for shearing metal beams and bars. In the fabrication of expanded trussed structures from beams or bars, it is necessary to provide intermittent feed mechanism for the work which is adapted for beams of maximum length and it is desirable that the machine should be adapted to properly shear slits in beams of shorter lengths. It is also desirable that the operation of the machine be variable to shear slits of different lengths in the beams according to the length of the strands and expansion desired in the expanded structures. A machine of this type is set forth in an application filed by me November 5, 1926, Serial No. 146,332.

In the operation of said machine, a toothed feed bar is used which is approximately, or at least as long, as the length of the beam being sheared, which, in some instances is of great length. For feeding the work for slits of different lengths, it is necessary to provide bars with differently spaced or numbered teeth so as to feed the work according to the number of slashes used in forming the slits and according to the width of the bonds left between the slits. This makes it necessary to provide a different feed bar of the maximum length of the work for each different product which requires different spacing of the slashes.

The object of the present invention is to provide improved feed mechanism for the work which comprises a comparatively short feed bar to save the cost of producing and handling long bars.

Other objects will appear from the detailed description.

The invention consists in the several novel features hereinafter set forth and more particularly defined by the claims at the conclusion hereof.

In the drawings: Fig. 1 is a front view of the portion of a machine adjacent the shear mechanisms. Fig. 2 is a front elevation of the end of the machine from which the beams are fed. Fig. 3 is a plan of the feed carriage and coacting parts. Fig. 4 is a view, partly in section and partly in front elevation of the feed-carriage and its associated parts. Fig. 5 is a section on line 5—5 of Fig. 2. Fig. $5^a$ is a section on line $5^a$—$5^a$ of Fig. 3. Fig. $5^b$ is a section on line $5^b$—$5^b$ of Fig. 4. Figs. $5^c$ and $5^d$ are front and rear perspectives of the work-feed carriage, respectively. Fig. 6 is a transverse section, showing one of the shearing mechanisms. Fig. $6^a$ is a section on line $6^a$—$6^a$ of Fig. 6. Fig. $6^b$ is a section of the operating connection for one of the shear mechanisms. Fig. $6^c$ is a transverse section on line $6^c$—$6^c$ of Fig. 1, showing the mechanism for operating the intermittent work-feed. Fig. $6^d$ is a section on line $6^d$—$6^d$ of Fig. $6^c$. Fig. 7 is a diagrammatic plan, showing a beam to be cut, the shearing blades, one of the toothed controller or feed bars for the carriage and the dogs which coact with the teeth of said bar before the beam has been sheared. Fig. $7^a$ is a similar diagram, illustrating the parts after the machine has commenced to slit the beam. Fig. $7^b$ is a detail showing the manner in which the beam is to be slitted, preparatory to its expansion. Fig. $7^c$ is a perspective of one of the controllers for the throw-out devices.

The invention is exemplified in a machine for shearing the work—a beam F with a web $f'$ and flanges $f^2$—with three series of slits to form a double expanded structure which comprises, mechanism A for shearing a series of slits $a$ adjacent one flange of the beam; mechanism $A^2$ for shearing a central series of slits $a'$ in the web; mechanism $A'$ for shearing the series of slits $a^2$ adjacent the other flange of the beam; mechanism B for resetting the deflected metal adjacent the slashes; and feed mechanism for intermittently advancing the work step-by-step through the shearing and resetting mechanisms.

The supporting structure of the machine comprises a bed C (Fig. 1) on which the carriages for the shearing and resetting mechanisms are mounted; a frame for supporting the devices which guide the work to the shearing mechanisms, composed of channel beams D (Figs. $5^a$ and $5^b$) and supporting brackets $d$, $d'$, $d^2$ and $d^3$ on which the beams D are fixedly secured; and a frame for supporting the devices which guide the beam after it has been cut, composed of channel beams E (Figs. 1 and 3) and brackets $e$, $e'$ to which said beams are fixedly secured.

The beam F, exemplifying the work to be sheared, is guided and supported in transit to the shearing mechanisms by a series of horizontally extending rollers $g$ on which the lower edges of the flanges of the beam F are adapted to ride. Each of said rollers (Figs. 2 and 5) is carried by a cross-shaft $g^4$ which is mounted in a pair of bell-crank levers $g^5$ which are fulcrumed on a shaft at $g^6$ in the frame-beams D. Each of these levers has one of its arms extending downwardly. The lower ends of all of said levers at either side are pivoted at $g^7$ to a bar $g^8$. One end of one of said bars $g^8$ is adjustably connected and secured by means of a bolt $g^9$ to a plate $g^{10}$. Holes $g^{11}$ permit the bar $g^8$ to be shifted longitudinally to simultaneously raise or lower all of the rollers for supporting the beam F in transit to the shearing mechanism. Bar $g^8$ is provided with two relatively offset holes $g^{11}$, and the plate $g^{10}$ is provided with two relatively staggered series of holes, so that the rollers may be adjusted accurately into the desired position for different beams which are to be cut. Similarly mounted and adjustable rollers $i$ (only one of which is shown) are supported by bell-crank levers $i^2$ which are fulcrumed in the beams E to adjustably support the beam after it has been sheared.

The shearing mechanism A is supported by a stationary carriage $a^4$, and each of the shearing mechanisms A′, A² is supported in a carriage $a^5$ which is adjustable longitudinally of the work. Each carriage $a^5$ is longitudinally adjustable on the bed C so that the shearing mechanisms A′, A² may be adjusted relatively to the mechanism A and relatively to each other to position them for shearing the initial slashes of slits of different lengths, so they will be spaced apart longitudinally to relatively position the slits according to the length of the strands and the expansion desired in the finished beams. The carriages $a^5$ are each mounted to slide longitudinally on tracks or guides $a^{30}$ formed in a plate $c$ (Fig. 6) which is anchored to the bed C. Bolts $a^{31}$ extend through each of said carriages and their heads are adapted to slide in longitudinal ways $a^{32}$ in plate $c$. When the bolts are tightened, they serve to hold the carriages in assigned positions and when loose permit them to be shifted. Each carriage $a^5$ is adapted to be readily shifted by gearing comprising a cross-shaft $c^2$ journalled in bearings $c^3$ on the carriage, a pinion $c^4$ rotatable by said shaft and meshing with a gear $c^5$ which is fixed to a shaft $c^6$ which is journalled in bearings $c^7$ mounted on the carriage, and pinions $c^8$ fixed to the outer ends of shaft $c^6$ and meshing with longitudinal racks $c^9$ which are fixed to and housed in angle bars $c^{10}$ which are fixed to the plate $c$. Each shaft $c^2$ may be turned by a wrench or crank to shift the carriage longitudinally of the work in either direction. This exemplifies mechanism for shifting two of the shearing mechanisms, so the spacing between them may be varied according to the longitudinal spacing between the beginning of the slits. The shearing mechanisms A, A′ and A² are similar in construction so that a description of one is applicable to all.

Each of said mechanisms comprises a stationary shear-blade $a^6$ and reciprocable shear-blade $a^{11}$. Blade $a^6$ is removably held and clamped between a plate $a^9$ and the vertical wall $a^8$ of a bed $a^{10}$. Movable shear-blade $a^{11}$ is removably clamped to a head $a^{12}$ by a plate $a^{14}$. The head $a^{12}$ for the reciprocable shear-blade $a^{11}$ is fulcrumed in a shaft $a^{15}$ at the back of the carriage. The coacting shear blades are adjustable transversely so that they may be set for different transverse spacings to vary the width of the strands, when desired for shearing different work. For this purpose, each bed $a^{10}$ for the stationary shear-blades $a^6$ is slidably mounted on its carriage and may be so adjusted by a screw $a^{16}$ which extends through a bracket $a^{17}$ on the carriage and is threaded to a depending lug $a^{18}$ on said bed. Bolts $a^{19}$ extend through slots in the bed $a^{10}$ to lock the bed in its adjusted position. A screw $a^{20}$ is provided to adjust the carriage backwardly to its desired position. To permit the movable cutter-head $a^{12}$ to be correspondingly adjusted to keep its cutting edge coactively positioned with respect to blade $a^6$, its fulcrum-shaft $a^{15}$ is mounted in a pair of suspension links $a^{21}$ which are hung from a pivot $a^{22}$ which is stationarily supported in its associated carriage. Links $a^{21}$ are pivoted to swing transversely to the line of travel of the work and to be adjusted by a screw $a^{24}$ which passes through a block $a^{241}$ which is pivoted in the lower end of links $a^{21}$ and has a nut to limit the backward movement of the fulcrum links and a set screw $a^{25}$ which extends through a block $a^{250}$ which is secured to the lugs on the lower ends of links $a^{21}$ and forces the links backwardly against the nut on screw $a^{24}$ to lock the links $a^{21}$ in their assigned position. An anvil $a^{60}$ supports the metal to limit its deflection by the blade $a^{11}$ and permits the said blade to shear and bend the metal between the anvil and the stationary shear-blade. This anvil is mounted on the bed $a^8$ and is transversely adjustable with the shear-blade $a^6$. This exemplifies a pair of coacting stationary and reciprocable shear-blades which are adjustable transversely to the line of travel of the work to permit them to be adjusted for different spacings between the slits and for slitting different portions of the webs of beams.

In transit through the shearing and resetting mechanisms, the web of the beam being operated upon is supported vertically by the stationary shear-blades and the supports $a^{60}$ and the anvil of the resetting mechanism. Transversely, the work is guided by the bars $h$ between which the work passes. The bars $h$ are held against spreading by front and rear abutment-heads $h^{20}$, one pair of which is associated with each mechanism. Each front head $h^{20}$ is threaded to a screw $h^{21}$ which is threaded to the associated carriage, to limit the forward movement of the front bar $h$. The rear head $h^{20}$ is similarly threaded and held by a screw $h^{22}$, the rear end of which is provided with a fork $h^5$ to hold said screw against rotation. The rear head $h^{20}$ is supported by an arm $h^{201}$ which is pivoted to one of the carriages $a^4$, $a^5$ and is yieldingly held to press the rear bar $h$ against the work by a spring $h^{202}$ which is around an eye-bolt $h^{203}$ hung on the carriage. Nuts $h^{204}$ on said bolt may be adjusted to vary the force of the spring.

The mechanism for driving and operating the movable cutter-heads comprises an electric motor K suitably mounted on the carriage $a^4$ of the shearing mechanism A; a pinion $k'$ on the shaft of the motor, a gear $k^2$ driven by said pinion and fixed to a shaft $k^3$ which is journalled in brackets $k^4$ and $k^5$ mounted on the carriage $a^4$; a pinion $k^6$, fixed to a shaft $k^3$, a gear $k^7$ driven by pinion $k^6$, and a longitudinally extending shaft $k^8$, to which gear $k^7$ is fixed, which extends through the carriages for, and drives all of, the shear-mechanisms. An eccentric $k^{10}$ is drivably and fixedly connected to the shaft $k^8$ by a key $k^{11}$ and operates the shear-mechanism A, and is confined in the forked upper portion of the carriage $a^4$ and journalled in bearings $k^9$ fixed in said carriage. An eccentric $k^{10}$ is similarly mounted in each of the carriages $a^5$ for the shear-mechanisms A' and A², and shaft $k^8$ is connected to drive them by keys which are adapted to slide in a longitudinal key-way $k^{12}$ in said shaft so that the shear-mechanisms A' and A² will be driven by said shaft and so as to permit the carriages $a^5$ for the shear mechanisms A' and A² to be adjusted relatively to each other and to maintain the driving relation between shaft $k^8$ and the eccentrices for said mechanisms in all positions of the carriages. Each eccentric $k^{10}$ operates a link $k^{14}$ which is connected to one of the heads $a^{12}$ of the movable shear-blades to impart a reciprocatory motion to said blade.

In shearing beams for joists or other structural steel, it is sometimes desired to control the operation of the movable shear-blades to leave predetermined portions of the beam unsheared. For example, in the formation of expanded metal joists, it is advantageous to omit the top and bottom slits adjacent the ends of the beam and to form only the central slit A' (Fig. 7ᵇ), so that the terminals of the flanges of the beam will be left with the webs thereon of greater width than the web-portions in the meshes to reinforce the end portions of the joists. For this purpose, variable means are provided to render each of the shear mechanisms A, A' inoperative when desired. Each link $k^{14}$ carries an abutment block $l$ which is fixed to a pin $l'$ which is pivoted in lugs $l^2$ on the head $a^{12}$ and slidable vertically in slots $l^4$. Normally, this abutment block engages a shoe $l^3$ which is fixedly held in a slot in the end of link $k^{14}$. When the abutment block $l$ is swung forwardly to clear the shoe $l^3$, the link $k^{14}$ may be reciprocated by the eccentric $k^{10}$ without imparting an operative stroke to the head $a^{12}$ and the shear-blade carried thereby. An arm $l^5$ is fixed to one end of the pin $l'$ and is automatically controlled by mechanism hereinafter set forth to time the inoperative periods of the shear-mechanism as desired according to the work. Arm $l^5$ is normally and yieldingly held by a spring $l^6$ in position to render the abutment block $l$ operative by the link $k^{14}$.

The mechanism for intermittently feeding the work to the shearing mechanisms comprises a carriage N which shifts an inwardly extending pusher-arm $n$ adapted to engage one flange $f^2$ of the I-beam F and fingers $n'$ to straddle the web of the beam, so that said beam will be advanced by the carriage. The pusher arm $n$ is pivoted at $n^{20}$ to a plate $n^{21}$ so that it may be raised or lowered to bring the fingers $n'$ in position to straddle the web $f$ of the beam F. A stop $n^{22}$ limits the downward pivotal movement of the finger $n$. The pivot $n^{20}$ for arm $n$ is fixed to a plate $n^{21}$ which is connected to the carriage N by means of bolts $n^{23}$ and slots $n^{24}$ which permit the plate and the arm to be adjusted transversely of the work to bring it into position to engage flanges of beams of different widths or heights. This carriage is guided to travel longitudinally of the work by an angle bar $n^2$ which is fixed to the top of the front frame beams D and E and extends across the gap between the said frame beams to form a track for the carriage N. This carriage is provided with a pair of forward rollers $n^4$ and a pair of rear rollers $n^5$ adapted to ride against the front and rear faces of the vertical flange of track $n^2$. The carriage comprises a frame N' which straddles and is supported on the track $n^2$ and a flat bar or plate $n^9$ which is secured thereto. Said plate $n^9$ extends longitudinally in advance of the carriage, and angle beams $n^{10}$ and $n^{11}$ are secured to and reinforce the projecting portions of said plate which is slidably supported on the track $n^2$. This forms a carriage-structure which is approximately as long as the longest beam to be cut, so that devices for controlling the operation of the shearing mechanisms, to leave unslit portions adjacent its ends when desired, may be correctly positioned for that purpose and supported on and to move with the carriage. The carriage-frame N' is extended to the front of the machine and downwardly, as at N². A longitudinally extending holder $n^{13}$ is secured to said extension and is adapted to retain a feed or charger bar M. This charger bar is formed with several series of upstruck teeth $m$ which are spaced apart according to the steps which the beam is to be advanced to cause the shear blades to lap their respective cuts to form elongated slits and in the desired number, according to the slashes necessary for slits to form strands of the desired length, and these series are spaced apart to leave the desired bonds between the ends of the slits. This bar M is removably held in holder $n^{13}$ by studs $n^{24}$ so the bars may be readily replaced so that bars with differently spaced teeth for different work may be inserted into the holder.

Coacting with the feed or charger bar are a series of pivoted dogs P, each of which is mounted in a block P'. These blocks are independently adjustable longitudinally of the machine, each being secured by set screws $P^2$ (Fig. 5) to the top flange of an I-beam $P^3$ which is slidably mounted in brackets $P^4$ which are bolted to the front frame-beams D and E. A sufficient number of dogs P are provided so that a comparatively short charger or feed-bar M will be constantly and successively in coacting relation with a sufficient number of them to cause it to advance the feed carriage N, regardless of the length of the work and to feed a beam of maximum length through the shearing mechanisms. By adjusting the blocks P' along the bar $P^3$, the dogs P may be positioned so they will be correctly located to coact with differently spaced teeth on a feed-bar.

The beam or bar $P^3$, with the entire series of dogs P mounted thereon, is reciprocated a distance in excess of the spacing between the teeth $m$ of the charger or feed-bar M, so that between the reciprocations of the shear-blades, some of the dogs P will engage the teeth of the bar M and alternately advance the feed-carriage a series of short strokes for shearing and a long stroke so the shear blades will skip and leave bonds between the slits. By employing a comparatively short feed or charger bar M, and providing a series of dogs sufficient in number to feed the carriage the full length of the beam, it becomes possible to use a comparatively short feed or charger bar. In a shearing machine which is adjustable for cutting slits of different lengths and for different longitudinal spacings, it is necessary that the charger bar be provided with teeth according to the number of slashes necessary to form each slit and according to said spacing. Resultantly, it is necessary to provide different charger bars for these different operations, and by making it possible to use a comparatively short bar, a considerable saving in cost of producing and handling these bars is effected.

The mechanism for reciprocating the bar $P^3$ comprises a wrist-pin $m^2$ which is operated by a collar $m^3$ (Fig. $6^c$) which is fixed to one end of, and rotates continuously with, the shaft $k^8$ which operates the shearing and resetting mechanisms; a block $m^4$ on said pin and slidable in a way $m^5$ formed in the front end of a lever $m^6$ which is pivoted on a stud $m^7$ which is supported on the carriage $a^4$ of the shearing mechanism A; a composite link $m^8$ pivoted at $m^9$ to the rear end of lever $m^6$ and at $m^{10}$ to a rocker arm $m^{11}$ which is provided at $m^{12}$ to said carriage; a link $m^{13}$ pivoted at $m^{14}$ to arm $m^{11}$ and at $m^{15}$ to an arm $m^{16}$; a transverse shaft $m^{17}$ mounted in bearings $m^{18}$ on carriage $a^4$ and keyed to arm $m^{16}$ an arm $m^{19}$ keyed to the front end of shaft $m^{17}$; a link $m^{20}$ pivoted by pin $m^{21}$ to arm $m^{19}$; a rocker lever $m^{22}$ (Fig. 1) fulcrumed at $m^{23}$ to bracket $e'$ and to the lower end of which link $m^{20}$ is pivoted and a link connection between the upper end of lever $m^{22}$ and the reciprocatory dog carrying bar $p^3$. The pivot pin $m^{21}$ between the link $m^{20}$ and arm $m^{19}$ is adjustable to and from the axis of shaft $m^{17}$ to permit the stroke imparted to the bar $p^3$ to be varied for different work, and for this purpose pin $m^{21}$ extends through a slot $m^{28}$ in arm $m^{19}$ and is provided with a nut by which it may be secured in its assigned position.

The connection between lever $m^{22}$ and the bar $p^3$ comprises a two-part link $m^{24}$ having its ends pivoted to said lever and bar respectively and a cushion spring $m^{25}$ between said parts, so that if the feed mechanism should be somewhat out of synchronism with the idle cycle of the shear-blades, the connection will yield, so the work will not be fed until it is free. The lever $m^{23}$ comprises a pivoted member $m^{250}$ held by a pin $m^{251}$ which will shear when subjected to excessive stresses and prevent breakage.

To permit the carriage to be retracted after the shearing of a beam has been completed, a release bar R has its ends coaxially pivoted, as at $r$, to the carriage N. Bar R is normally positioned, as shown by full lines in Fig. 5 of the drawings, and when swung into horizontal position, shown by dotted lines, it will simultaneously depress the tails $p^{20}$ of the dogs P which are in engagement with the charger bar and successively depress the remaining dogs as the carriage is retracted, so the dogs will be free from the charger-bar during the retractile movements of the carriage to bring it into its starting position.

To automatically and individually control the cutting operation of the shear mechanisms A and A', to selectively render them inoperative and leave unslitted portions adjacent the ends of the beam, as shown at the right of Fig. $7^b$, the carriage N has secured thereto devices O for operating the arms $1^5$ of the throw-out devices for the movable cutters of mechanisms A and A', which are adjustably clamped to said bar $n^9$ and the angle bars $n^{10}$, $n^{11}$ secured thereto. Each of these controller devices comprises a pair of members $o^4$ and $o^5$ which may be clamped at any point to said bars $n^9$, $n^{10}$ by a bolt $o^6$, and the top member $o^5$ of each controller is adapted to strike the lower end of a lever $o^7$ which is pivoted to a bracket $o^9$ which is fixed to one of the carriages of the shear-mechanisms A, A'. Lever $o^7$ comprises an arm $o^{12}$ which is connected to and pulls a chain $o^{10}$ which is guided on a sheave $o^{11}$ mounted on said bracket and connected to an arm $l^5$. As a result, when a member $o^5$ strikes the lever $o^7$ in the forward movement of the carriage N, the lever will operate the chain $o^{10}$ to rock the shaft $l'$ and swing the abutment $l$ out of the shoe $l^3$, so that the pin $l'$ carried by the operating head $a^{12}$ will not be operated to force the shear-blade $a^{11}$ into or through the beam being sheared. Lever $o^7$ is free to swing to the left independently of the chain $o^{10}$, so that when the carriage is retracted after a beam has been sheared, the throw-out devices will not be operated. The arms $o^7$ of the shearing mechanisms A and A' respectively are attached to the inner and outer sides of the bar $o^2$, so that each of the controlling clamps will operate one of the throw-out levers $o^7$ and clear the other. By adjusting the throw-out devices along the bars $o^2$, $o$, they may be set to control the shearing mechanisms A, A' to leave intact portions in beams of different lengths or at different portions of the beams. This exemplifies mechanism for automatically controlling the shearing mechanism to render the shear-blades inoperative at predetermined points where it is desired to omit the slit, such as at the upper and lower slits of a beam used to form an expanded trussed joist.

The friction between the bars $n^{10}$ and $n^{11}$ and the vertical flange of the track $n^2$ is sufficient to prevent retraction of the carriage. To aid the operator in retracting the carriage N after the cutting of a beam has been completed, a cable S is provided with a hook $s'$ which is adapted to engage the plate $n^9$ of the carriage. This cable is guided by a pulley $s^2$ which is carried by an arm $s^3$ fixed to the bracket $h^5$ of the carriage $a^4$ of the shearing mechanism A and extends around an overhead sheave (not shown) and has attached thereto a weight.

Assuming the beams to be sheared, preparatory to expansion, are of a given size or shape, the shear mechanisms A', A² are set in longitudinal relation to each other, according to the length of the slits desired for that work. The carriages $a^5$ for the shear mechanisms A', A² may be readily adjusted by turning the shafts $c^3$. The cutter-heads $a^{12}$ for reciprocating shear blades $a^{11}$ and the beds $a^{10}$ for the stationary shear-blades $a^6$ and anvil $a^{60}$ are also adjusted transversely so the slits will be spaced transversely from one another as desired, according to the width of the strands desired in the work, and to retain the shear blades of each mechanism in accurate coacting relation. Rollers $g$ are adjusted vertically to support the beam to be cut so its web will be guided between the shear-blades. Bars $h$ will be adjusted to guide the work transversely through the shearing mechanisms. The rollers $i$ for supporting the sheared beam will be adjusted to bring them into the plane of the lower edges of the flanges of the work. A suitable feed-bar M, formed with a series of teeth $m$ and spaces $m^{40}$, to correspond to the number of slashes required for each slit of the desired length and the spacing between the slits, to form bonds, will be placed in the holder $n^{13}$ of the carriage N, and the latter will be placed in its retracted position so the rear end of the beam may be placed in front of the pusher arm $n$ with its web between fingers $n'$. The stroke of the arm $m^{22}$ moving bar P³ may be adjusted by the adjustment of pin $m^{21}$ in the arm $m^{19}$ to impart to said bar strokes required for the work. This stroke is sufficient to impart to the work the longer stroke required in forming the bonds between the slits, which stroke substantially equals the width of cutter plus the bond. The dogs on the bar P³ idle in their advancing movements distances equal to the long stroke and the short stroke required for the shearing strokes. In practice, the operative strokes of the work will be such as to cause the slashes to overlap or connect to form continuous slits of the desired length. In setting the shear mechanisms longitudinally, they are adjusted so all of the mechanisms will simultaneously start and finish the slits after the work has reached the mechanism A². If some of the slits are to be omitted adjacent the ends of the beam, the controller devices O are set in proper position on the carriage to cause them to throw out the shear mechanisms A and A' at periods when such portions pass between the shear blades of said mechanisms. The machine will then be in readiness for operation according to its setting. The beams to be sheared will be successively laid on rollers $g$ and fed through the shear mechanisms. The motor K will then be started and the beam will be alternately advanced and sheared and the operation will be continued until the entire beam has been sheared throughout its length. The feed bar carried thereby will pass successively into operative range of the succeeding dogs P on the reciprocating bar P³ until the entire beam has been operated on. The carriage N will be retracted after each operation into position to commence to feed the next beam.

The resetting mechanism B is of the construction set forth in my aforesaid application No. 146,332.

The invention exemplifies a reciprocatory machine for shearing beams which is adapted to be adjusted for beams of different sizes, shapes or lengths and in which the beam is automatically fed by mechanism which comprises a feed or charger bar which is comparatively short and shorter than the work so that it is unnecessary to provide a large number of charger bars of a length approximately equivalent to the maximum length of the beams to be cut for use in shearing different work.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a machine of the character described, the combination of shearing mechanisms for cutting metal beams or bars on different lines, each comprising a reciprocable shearing element, mechanism for operating said elements, and mechanism for intermittently feeding the work comprising a feed carriage, a toothed bar shorter than the work connected to the carriage, and a series of progressively acting dogs for the bar.

2. In a machine of the character described, the combination of shearing mechanisms for cutting metal beams or bars on different lines, each comprising a reciprocable shearing element, mechanism for operating said elements, and mechanism for intermittently feeding the work comprising a feed carriage, a toothed bar shorter than the work connected to the carriage, and a series of progressively acting dogs for the bars adjustable relatively to one another.

3. In a machine of the character described, the combination of shearing mechanisms for cutting metal beams or bars on different lines, each comprising a reciprocable shearing element, mechanism for operating said elements, and mechanism for intermittently feeding the work comprising a reciprocable carriage, a replaceable toothed bar shorter than the work connected to the carriage, and a series of progressively acting dogs for the bar.

4. In a machine of the character described, the combination of shearing mechanisms for cutting metal beams or bars on different lines each comprising a reciprocable shearing element, mechanism for operating said elements, and mechanism for intermittently feeding the work comprising a reciprocable feed carriage, a toothed bar shorter than the work mounted on the carriage, and a series of dogs to progressively engage the bar.

5. In a machine of the character described, the combination of shearing mechanisms for cutting metal beams or bars on different lines each comprising a reciprocable shearing element, mechanism for operating said elements, and mechanism for intermittently feeding the work comprising a reciprocable feed carriage, a toothed bar shorter than the work replaceably mounted on the carriage, and a series of dogs to progressively engage the bar.

6. In a machine of the character described, the combination of shearing mechanisms for cutting metal beams or bars on different lines each comprising a reciprocable shearing element, mechanism for operating said elements, and mechanism for intermittently feeding the work comprising a reciprocable feed carriage, a toothed bar shorter than the work replaceably mounted on the carriage, and a series of dogs progressively acting on the bar, adjustable relatively to one another.

7. In a machine of the character described, the combination of shearing mechanisms for cutting metal beams or bars on different lines each comprising a reciprocable shearing element, mechanism for operating said elements, and mechanism for intermittently feeding the work comprising a reciprocable feed carriage, a removable toothed bar shorter than the work mounted on the carriage, a series of dogs to progressively engage the bar, and a variable stroke device for operating said intermittent mechanism.

8. In a machine of the character described, the combination of shearing mechanisms for cutting metal beams or bars on different lines each comprising a reciprocable shearing element, mechanism for operating said elements, and mechanism for intermittently feeding the work comprising a reciprocable carriage, a removable toothed bar shorter than the work mounted on the carriage, a series of adjustable progressively acting dogs for the bar, and a variable stroke device for operating said intermittent mechanism.

9. In a machine of the character described, the combination of shearing mechanisms for cutting metal beams or bars on different lines each comprising a reciprocable shearing element, mechanism for operating said elements, and mechanism for intermittently feeding the work comprising a feed carriage, a toothed bar shorter than the work replaceably mounted on the carriage, a series of progressively acting dogs for the bar and mechanism for reciprocating the dogs.

10. In a machine of the character described, the combination of shearing mechanisms for cutting metal beams or bars on different lines each comprising a reciprocable shearing element, mechanism for operating said elements, and mechanism for intermittently feeding the work comprising a carriage, a toothed bar shorter than the work replaceably mounted on the carriage, a series of dogs to successively engage the toothed bar, a bar on which the dogs are adjustably mounted, and mechanism for reciprocating the dog-bar.

11. In a machine of the character described, the combination of shearing mechanisms for cutting metal beams or bars on different lines each comprising a reciprocable shearing element, mechanism for operating said elements, and mechanism for intermittently feeding the work comprising a carriage, a toothed bar shorter than the work replaceably mounted on the carriage, a series of dogs to progressively engage the bar, and mechanism with a variable stroke for reciprocating the dogs.

12. In a machine of the character described, the combination of reciprocatory shearing mechanisms for cutting metal beams or bars on different lines each comprising a pair of coacting shearing elements, the mechanisms being spaced apart and adjustable longitudinally relatively to each other, for shearing slits of different lengths and adjustable transversely to vary the transverse spacing between the slits, mechanism for operating the shearing mechanisms and variable mechanism for intermittently feeding the work so the elements will simultaneously cut connected slashes to form elongated slits with bonds between them comprising a replaceable toothed bar shorter than the work and a series of progressively acting dogs for the bar.

13. In a machine of the character described, the combination of reciprocatory shearing mechanisms for cutting metal beams or bars on different lines each comprising a pair of coacting shearing elements, the mechanisms being spaced apart and adjustable longitudinally relatively to each other, for shearing slits of different lengths and adjustable transversely to vary the transverse spacing between the slits, mechanism for operating the shearing mechanisms and variable mechanism for intermittently feeding the work so the elements will simultaneously cut connected slashes to form elongated slits with bonds between them comprising a replaceable toothed bar shorter than the work and a series of adjustable progressively acting dogs for the bar.

14. In a machine of the character described, the combination of reciprocatory shearing mechanisms for cutting metal beams or bars on different lines each comprising a pair of coacting shearing elements, the mechanisms being spaced apart and adjustable longitudinally relatively to each other, for shearing slits of different lengths and adjustable transversely to vary the transverse spacing between the slits, mechanism for operating the shearing mechanisms, and variable mechanism for intermittently feeding the work so the elements will approximately simultaneously cut connected slashes to form elongated slits with bonds between them comprising a replaceable toothed bar shorter than the work, a series of progressively acting dogs for the bar, and a variable stroke device for operating the intermittent mechanism.

15. In a machine of the character described, the combination of reciprocatory shearing mechanisms for cutting metal beams or bars on different lines each comprising a pair of coacting shearing elements, the mechanisms being spaced apart and adjustable longitudinally relatively to each other, for shearing slits of different lengths and adjustable transversely to vary the transverse spacing between the slits, mechanism for operating the shearing mechanisms, mechanism for intermittently feeding the work so the elements will approximately simultaneously cut connected slashes to form elongated slits with bonds between them, comprising a replaceable toothed bar shorter than the work, and a series of dogs to progressively engage the bar, and a device for disengaging the dogs and bar during the return of the carriage after a beam has been sheared.

16. In a machine of the character described, the combination of shearing mechanisms for cutting metal beams or bars on different lines each comprising a reciprocable shearing element, mechanism for operating said elements, mechanism for intermittently feeding the work comprising a carriage, a toothed bar shorter than the work replaceably mounted on the carriage, a series of dogs to progressively engage the bar and mechanism for reciprocating the dogs, and a device, movably mounted on the carriage, for rendering the dogs inoperative during return of the carriage after a beam has been sheared.

17. In a machine of the character described, the combination of reciprocatory shearing mechanisms for cutting metal beams or bars on different lines, each comprising coacting shearing elements, mechanism for operating said shearing mechanisms, mechanism for intermittently feeding the work longitudinally to the shearing mechanism comprising a longitudinally movable carriage, a toothed bar shorter than the work connected to the carriage, and a series of progressively acting dogs for the bar, and devices for rendering the shearing mechanisms ineffective comprising controller elements mounted on the carriage.

18. In a machine of the character described, the combination of reciprocatory shearing mechanisms for cutting metal beams or bars on different lines, each comprising coacting shearing elements, mechanism for operating said shearing mechanisms, mechanism for intermittently feeding the work longitudinally to the shearing mechanism comprising a longitudinally movable carriage, a toothed bar shorter than the work connected to the carriage, and a series of progressively acting dogs for the bar, and devices for rendering the shearing mechanisms ineffective comprising controller elements adjustably mounted on the carriage.

19. In a machine of the character described, the combination of reciprocatory shearing mechanisms for cutting metal beams or bars on different lines, each comprising coacting shearing elements, mechanism for operating said shearing mechanisms, and mechanism for intermittently feeding the work longitudinally to the shearing mechanism comprising a longitudinally movable carriage, a toothed bar shorter than the work connected to the carriage, and a series of progressively acting dogs for the bar, and a yielding connection for operating the intermittent mechanism.

20. In a machine of the character described, the combination of reciprocatory shearing mechanisms for cutting metal beams or bars on different lines, each comprising coacting shearing elements, mechanism for operating said shearing mechanisms, and mechanism for intermittently feeding the work longitudinally to the shearing mechanism comprising a longitudinally movable carriage, a toothed bar shorter than the work connected to the carriage, and a series of progressively acting dogs for the bar, and vertically adjustable means on the carriage for pushing the work.

21. In a machine of the character described, the combination of reciprocatory shearing mechanisms for cutting metal beams or bars on different lines, each comprising coacting shearing elements, mechanism for operating said shearing mechanisms, and mechanism for intermittently feeding the work longitudinally to the shearing mechanism comprising a longitudinally movable carriage, a toothed bar shorter than the work connected to the carriage, and a series of progressively acting dogs for the bar, and laterally adjustable means on the carriage for pushing the work.

22. In a machine of the character described, the combination of reciprocatory shearing mechanisms for cutting metal beams or bars on different lines, each comprising coacting shearing elements, mechanism for operating said shearing mechanisms, and mechanism for intermittently feeding the work longitudinally to the shearing mechanism comprising a longitudinally movable carriage, a toothed bar shorter than the work connected to the carriage, and a series of progressively acting dogs for the bar, and vertically and laterally adjustable means on the carriage for pushing the work.

23. In a machine of the character described, the combination of reciprocatory shearing mechanisms for cutting metal beams or bars on different lines, each comprising coacting shearing elements, mechanism for operating said shearing mechanisms, and mechanism for intermittently feeding the work longitudinally to the shearing mechanism comprising a longitudinally movable carriage, a replaceable toothed bar shorter than the work on the carriage and a series of progressively acting dogs for the bar, and vertically and laterally adjustable means on the carriage for pushing the work.

Signed at East Chicago, Indiana, this 23rd day of September, 1926.

ALBERT J. BATES, Jr.